H. P. KRAFT & M. C. SCHWEINERT.
CAP FOR VALVES, STAY BOLTS, AND THE LIKE.
APPLICATION FILED APR. 6, 1907.

1,122,613.  Patented Dec. 29, 1914.

WITNESSES:
Fred White
René Buine

INVENTORS:
Henry P. Kraft and
Maximillian Charles Schweinert,
By Attorneys,
Arthur B. Fraser & Usina

UNITED STATES PATENT OFFICE.

HENRY P. KRAFT, OF NEW YORK, N. Y., AND MAXIMILLIAN CHARLES SCHWEINERT, OF WEST HOBOKEN, NEW JERSEY.

CAP FOR VALVES, STAY-BOLTS, AND THE LIKE.

1,122,613.   Specification of Letters Patent.   Patented Dec. 29, 1914.

Application filed April 6, 1907. Serial No. 366,708.

*To all whom it may concern:*

Be it known that we, HENRY P. KRAFT, residing in the borough of Brooklyn, county of Kings, city and State of New York, and MAXIMILLIAN CHARLES SCHWEINERT, residing in West Hoboken, in the county of Hudson and State of New Jersey, citizens of the United States, have jointly invented certain new and useful Improvements in Caps for Valves, Stay-Bolts, and the like, of which the following is a specification.

This invention relates to caps which are adapted to be screwed upon tire valves, stay-bolts or the like, in which means are employed for retaining or locking the cap in place. In some of its features, however, our invention is applicable to lock-nuts and similar devices.

Figure 1:
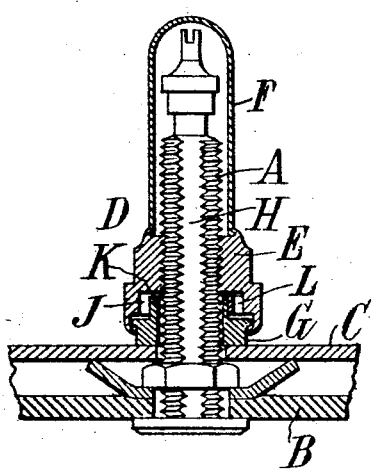
Figure 2:
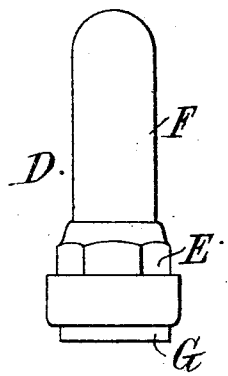
Figure 3:
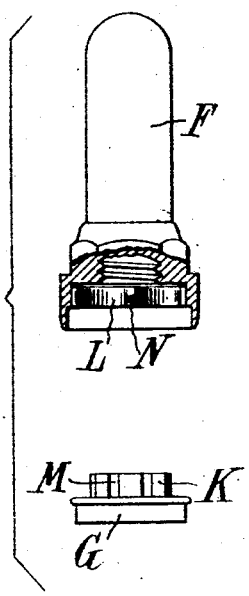
Figure 4:
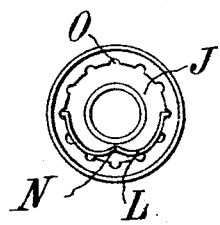
Figure 5:
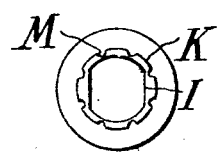

In the drawings illustrating our invention,—Figure 1 is a view of our invention applied to an automobile tire valve, the valve being shown in elevation and the cap in section. Fig. 2 is an elevation of the cap. Fig. 3 is a view showing the parts of the cap before assembling, the nut being shown partly in vertical section, and the washer being shown in elevation. Fig. 4 is a bottom or under side view of the cap proper. Fig. 5 is a top view of the detached washer.

Referring to the drawings, let A indicate a pneumatic tire valve of common construction which is connected with the tire B and extends through the rim C.

D indicates the cap as a whole which is provided with internal screw-threads adapted to engage the outer wall of the valve to hold the latter against inward movement and to protect it from dust, injury, etc.

In the construction shown the cap comprises a nut E having fixed to its upper end a sheet-metal cap F which is provided with an outwardly extending flange at its lower end engaged by an inwardly extending flange upon the nut. The nut E has swiveled to its lower end a washer G which is designed to press against the rim C, and to be held against rotation either by its frictional contact with the rim, or by engagement with the flat wall H formed on the valve. In the latter case the washer is formed on its interior with one or more straight faces I, as shown in Fig. 5.

The nut E is provided with a recess J (Figs. 1 and 4) into which extends a reduced portion or axial flange K formed upon the upper face of the washer. The recess J is of sufficiently larger diameter than the flange K to permit the introdu tween such flange and the wall of the recess of a spring L. The flange K is formed with a series of notches M on its outer side, which are adapted to receive an inwardly projecting portion N formed upon the spring L. The spring is made of sufficient stiffness to prevent the accidental reverse rotation of the nut when the latter is screwed home, but is sufficiently yielding to permit relative movement of the parts by a wrench or other tool. The ends of the spring are bent angularly to the body portion and engage notches O formed upon the wall of the recess J. While one or two of the notches O would be sufficient in the construction shown, we prefer to form a series of notches, in order that, if the spring should by any means become disengaged, it will, after a slight rotative movement, catch in one or more of the succeeding notches.

An important feature of our invention is its extreme simplicity and economy of manufacture. By arranging the spring so that it makes a lateral engagement with the nut and washer, we are enabled to form such notches so that they extend axially of the parts, by the use of a drifting tool. This enables us to avoid the expensive operation of swaging or cutting such notches in the upper and lower faces of the washer and nut, as has been heretofore proposed. By the present invention the entire series of notches in each part can be cut in a single operation. By this means the nut may as cheaply be provided with a series of notches O as with a single notch or a pair of notches.

While we have shown our invention as applied to a cap for tire valves, it may be utilized as a cap for stay-bolts or the like without further modification than a proper proportioning of the parts.

Our invention is not limited to the use of devices which form a protecting covering for the parts to which they are attached, but may also be applied to lock nuts or similar devices in which the protecting feature is omitted. It is obvious that instead of using a washer in connection with the device, a second nut may be employed. It will also be understood that the construction herein shown and described may be considerably modified without departing from the invention.

What we claim is:—

1. A cap for tire valves, stay-bolts or the like, having a cap portion at one end thereof, a nut fixed to said cap portion, a washer swiveled to said nut, a spring interposed between said washer and nut and adapted to laterally engage both said parts, and a series of axially-arranged notches formed on said nut and washer adapted to receive said spring.

2. A cap for tire valves, stay-bolts or the like, having a cap-portion at one end thereof, a nut fixed to said cap-portion having a recess upon its lower face, a washer swiveled to said nut having a reduced extension adapted to fit within the recess within said nut, a spring interposed between said nut and the extension on said washer and adapted to laterally engage both said parts, and a series of notches upon said nut and the extension on said washer adapted to be engaged by said spring to prevent relative rotary movement between said nut and washer.

3. A cap for tire valves, stay-bolts or the like, having a cap-portion at one end thereof, a nut fixed to said cap-portion having a recess upon its lower face and a circular flange, a washer swiveled to said nut having an extension adapted to fit within the recess within said nut, and a circular outwardly extending flange upon its periphery, a spring interposed between said nut and the extension on said washer and adapted to laterally engage both said parts, and a series of notches upon said nut and the extension on said washer adapted to be engaged by said spring to prevent relative rotary movement between said nut and washer; said flange upon said nut extending over said flange on said washer so as to form a protecting covering for the swivel joint.

4. A cap for tire valves, stay-bolts or the like, comprising a nut having a recessed lower face, a washer swiveled to said nut having a reduced extension adapted to fit within the recess in the lower face of said nut, and a spring interposed between said nut and the extension on said washer within the recess in said nut, and adapted to laterally engage both said parts for preventing relative displacement.

In witness whereof, we have hereunto signed our names in the presence of two subscribing witnesses.

HENRY P. KRAFT.
MAXIMILLIAN CHARLES SCHWEINERT.

Witnesses:
EUGENE V. MYERS,
THEODORE T. SNELL.